(No Model.)
G. DUNN.
MECHANISM FOR SECURING PAPER SPOOLS TO THEIR SHAFTS.
No. 247,808.  Patented Oct. 4, 1881.
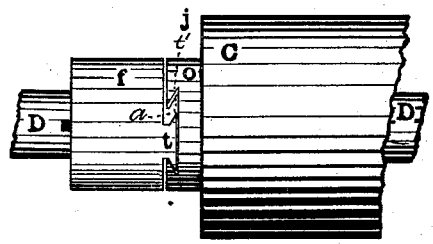
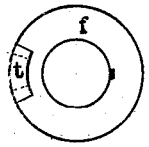 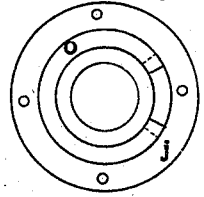 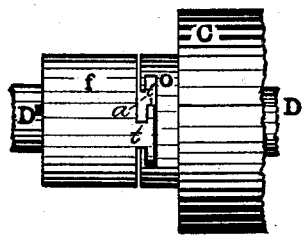
Witnesses;
Geo. O. Kingsbury
Edward H. Lattup
Inventor;
George Dunn
By Allen Webster
atty.

UNITED STATES PATENT OFFICE.

GEORGE DUNN, OF NORTH WILBRAHAM, MASSACHUSETTS.

MECHANISM FOR SECURING PAPER-SPOOLS TO THEIR SHAFTS.

SPECIFICATION forming part of Letters Patent No. 247,808, dated October 4, 1881.

Application filed February 28, 1881. (No model.)

*To all whom it may concern:*

Be it known that I, GEORGE DUNN, of North Wilbraham, in the county of Hampden and State of Massachusetts, have invented new and useful Improvements in Mechanism for Securing Paper-Spools to their Shafts, of which the following is a full and accurate description, which will enable others skilled in the art to which it appertains to construct and use the same, reference being had to the accompanying drawings and letters of reference marked thereon, which form a part of this specification.

This invention relates to spool mechanism in machines where a removable spool is employed.

Heretofore these spools have been fastened to the shaft by means of a collar with a square projection and a set-screw at each end of the spool, said projections entering corresponding recesses in the spool ends. This method of fastening the spools is objectionable for many reasons, among which may be stated much time is required to adjust and fasten the spool in place; the set-screws roughen the shaft, often rendering it necessary to use a spool which fits the shaft loosely; also, the spool often slips and becomes loosened upon the shaft, and the projecting set-screws revolving with the spool or collar are dangerous.

The object of my invention is to provide a device which will obviate these objectionable features of the old device.

My invention consists in the combination, with a shaft having a spool provided with a peculiarly-constructed recess, of a collar secured on said shaft and provided with an extension having locking-projections to enter the recess of the spool, as will be hereinafter more fully described, and pointed out in the claim.

In the accompanying drawings, Figure 1 is a side view of a portion of a shaft and spool, showing my device. Fig. 2 is an end view of the collar. Fig. 3 is an end view of the spool, and Fig. 4 is a similar side view, showing a modification of my device.

The removable spools to which my invention is applied are used in paper-making machines, paper cutting and calendering machines, as well as the continuous-feed printing-presses.

It has been necessary heretofore when a spool was removed to loosen a set-screw and remove a collar upon the shaft. To obviate this objectionable feature of the old device I either key the collar $f$ to the shaft D or sink the set-screw below the surface, thus doing away with the objectionable projecting set-screw. The collar $f$ has an extension, $t$, provided with projections $t'$, which I prefer to make dovetailing, as shown in Fig. 1 of the drawings.

In one end of the spool C, or in the end O, is formed a recess, $a$, to receive the projection $t$ of the collar, the opening in the clear being sufficient to allow the entrance of the piece $t$ when mounted upon the shaft. By this construction of the collar, with the double angular-shaped engaging projection $t$ and the dovetailed recess on the end of the spool, a locking-clutch device is formed and a right or left lock movement is given to the spool mounted on the shaft; also, by this construction only one collar is required with the spool, the construction being such that all lateral motion is prevented while the shaft revolves.

I deem the construction shown in Fig. 1 the best; but many modifications may be made. One of the modifications is shown in Fig. 4, the difference being in the shape of the recess and extension of the locking-piece.

It will readily be seen that the operation of the parts will be the same if the projecting piece be upon the spool and the recess in the collar.

Several spools may be locked together upon the same shaft by providing the ends of the spool opposite the collar with similar projections to the one upon the collar.

Having thus described my invention, what I claim as new, and desire to secure by Letters Patent, is—

The combination, with a shaft having a spool provided with a recess, substantially as described, of the collar secured on said shaft, and provided with an extension having locking-projections to enter the recess, as specified.

In testimony whereof I have hereunto set my hand, in the presence of two witnesses, this 25th day of February, A. D. 1881.

GEORGE DUNN.

Witnesses:
ROBERT M. WILSON,
EZRA A. D. WILSON.